F. N. SPRAGUE.
VARIABLE TENSION SHOCK ABSORBING AND REBOUND SPRING FOR AUTOMOBILES AND OTHER VEHICLES.
APPLICATION FILED JAN. 29, 1914.
1,125,199.
Patented Jan. 19, 1915.
2 SHEETS—SHEET 2.
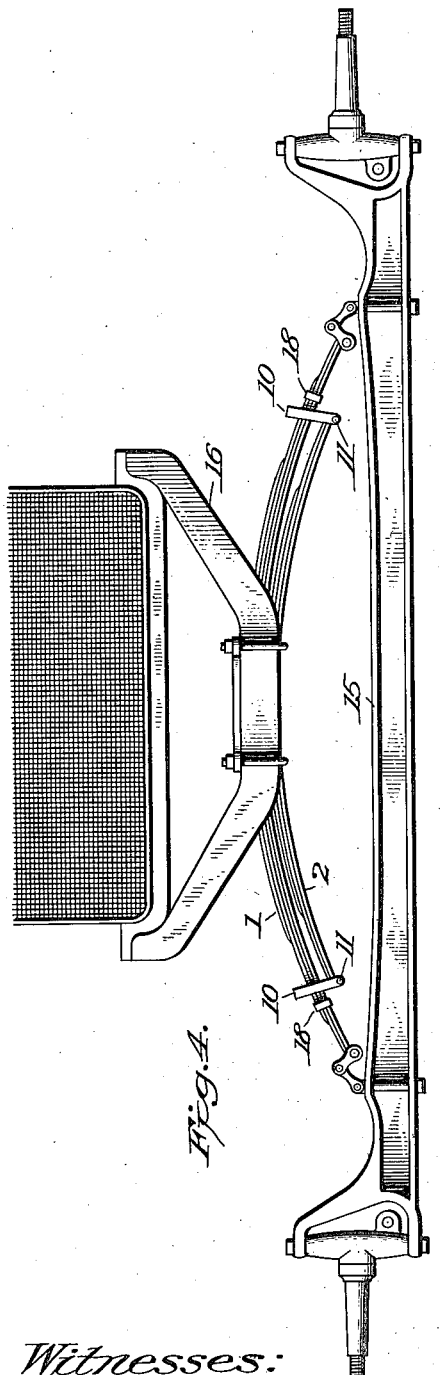
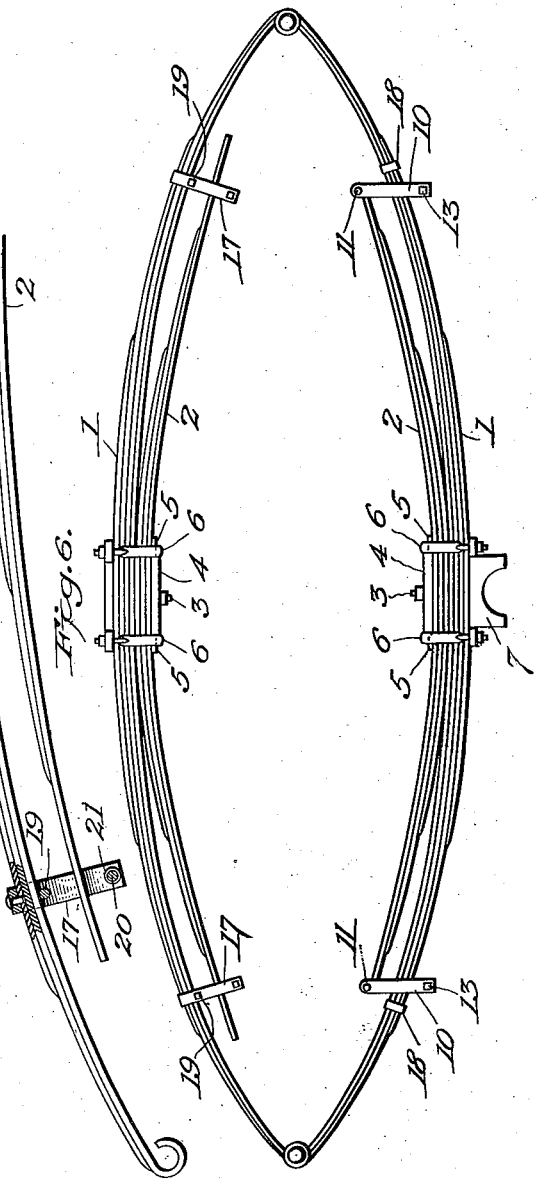
Witnesses:
G. Sargent Elliott
Herbert L. Chase
Inventor
Frank N. Sprague.
By H. S. Bailey
Attorney.

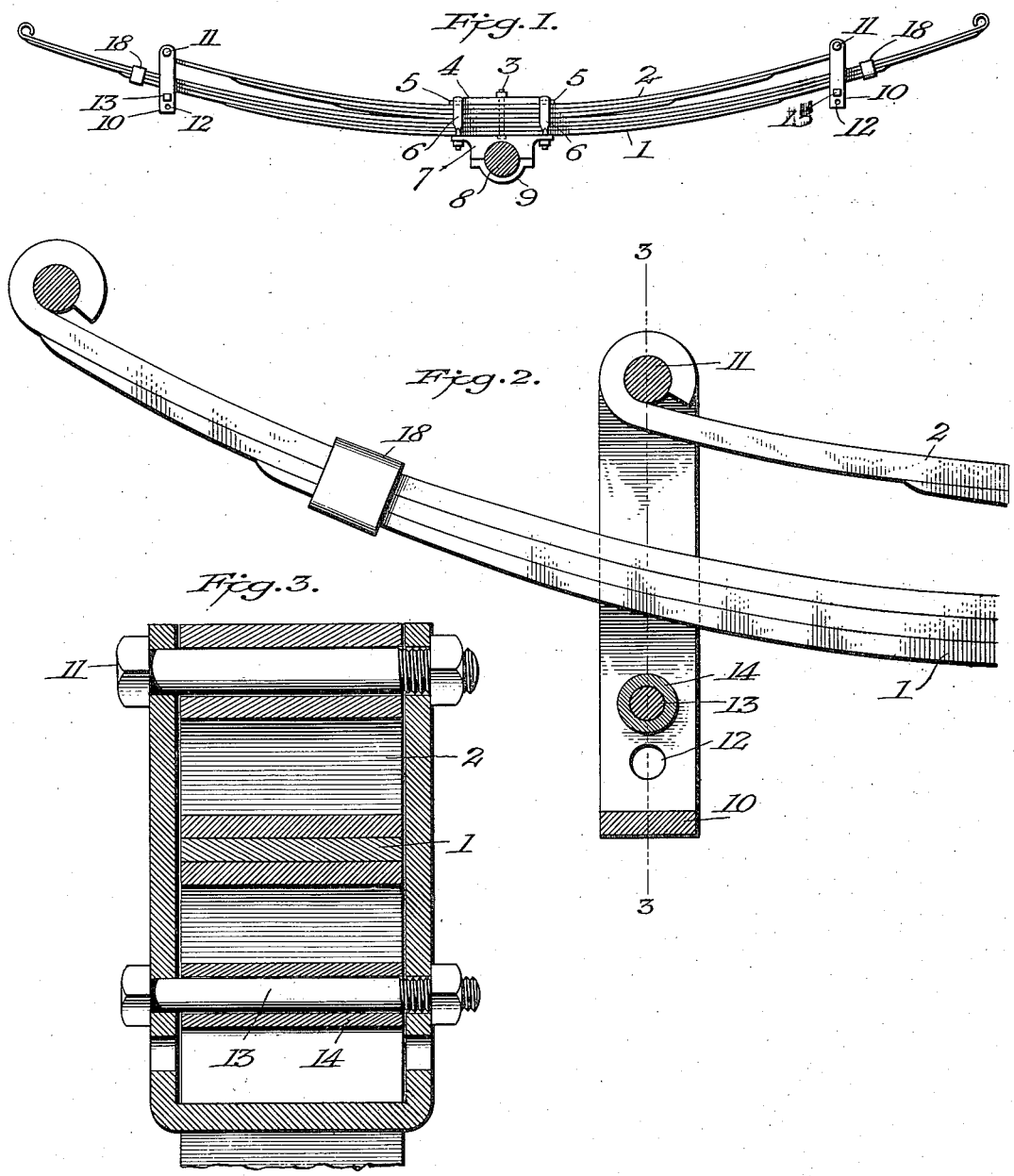

UNITED STATES PATENT OFFICE.

FRANK N. SPRAGUE, OF SEDGWICK COUNTY, COLORADO.

VARIABLE-TENSION SHOCK-ABSORBING AND REBOUND SPRING FOR AUTOMOBILES AND OTHER VEHICLES.

1,125,199.  Specification of Letters Patent.  Patented Jan. 19, 1915.

Application filed January 29, 1914. Serial No. 815,208.

*To all whom it may concern:*

Be it known that I, FRANK N. SPRAGUE, a citizen of the United States of America, residing in Sedgwick county and State of Colorado, have invented a new and useful Variable-Tension Shock-Absorbing and Rebound Spring for Automobiles and other Vehicles, of which the following is a specification.

This invention relates to improvements in variable tension cushioning leaf springs for automobiles and other vehicles.

The object of the invention is, first, to provide a vehicle spring which affords the required degree of stiffness or tension for average road and load conditions, and which is so arranged as to afford additional stiffness or tension to meet added stress resulting from the violent compression and rebound of the said spring, due to rough and uneven roads; second, to provide a vehicle cushioning leaf spring, comprising main and supplemental parts so related that the supplemental part coöperates with the main part only when additional tension or stiffness is required, to cushion violent shocks occasioned by excessive compression and rebound of said spring; third, to provide a vehicle cushioning leaf spring comprising main and supplemental parts, the combined strength or tension of which is greater than is required under average conditions, when the main part affords sufficient tension, the supplemental part coöperating only when the spring is subjected to excessive compression and rebound, thus reducing the liability of breakage to a minimum.

These objects are accomplished by the form of spring illustrated in the accompanying drawings, in which,—

Figure 1, is a side view of a semi-elliptical vehicle spring constructed in accordance with my invention, and showing the arrangement of the same when used on the side of a vehicle. Fig. 2, is an enlarged side view partly in section, of one end of the spring, showing the stirrup which is secured to the end of the supplemental spring, and which is adapted to be engaged by the main spring when under excessive compression. Fig. 3, is a vertical transverse sectional view on the line 3—3 of Fig. 2. Fig. 4, is a front view, showing the application of the spring to the forward axle of an automobile, the spring being in a reverse position to that shown in Fig. 1. Fig. 5, is a side view of one end of a spring arranged as in Fig. 4, and showing a modification in the arrangement of the stirrup. And Fig. 6, is a side view of an elliptical spring embodying my improvements.

Referring to the accompanying drawings,—the numeral 1, indicates the main part, and 2 the supplemental part, of my improved vehicle cushioning spring, each part being made up of a plurality of independent blades or leaves, which are arranged one upon another in the usual manner, the improvement being adaptable to either elliptical or semi-elliptical springs. In the construction of my improved spring, I employ a greater number of spring members or leaves, than are necessary under average road conditions, but the full tension of the spring is not utilized under such conditions, so that on smooth roads where the springs are not subjected to excessive compression and rebound, the weight of the vehicle is cushioned by a portion of the spring members or leaves only, which afford sufficient tension or stiffness under such conditions, and permit an easy up and down swinging movement of the vehicle. But when rough roads are encountered, causing violent compression and rebound of the springs, their full strength or cushioning power is brought into action, and the shock, both on the compression and rebound, is absorbed so gradually as to eliminate the jerking and bouncing effect common in springs of the usual construction, where the full tension of all of the spring members is at all times exerted.

In the accompanying drawings, the main part 1, of the springs, is shown made up of four leaves of varying lengths, arranged in the usual manner, and upon the longest leaf of this spring rests the supplemental spring 2, which is shown made up of three leaves arranged in the usual manner. The leaves of both parts are secured together at their centers by a bolt 3, which passes through them, and through a plate 4, which rests upon the longest leaf of the supplemental spring. The plate 4 is stepped at each end, as shown at 5, and over the stepped end 5 are placed the usual U-clips 6, the free ends of which are threaded, and pass through and are bolted to a seat 7, in the case of a semi-elliptical side spring, as in Fig. 1, which seat rests upon and partially surrounds the axle 8 of the vehicle, and is rigidly clamped thereon by the usual clamping member 9. which partially surrounds the axle and is bolted to the spring seat 7. The seat 7 and clamp 9, are also employed to secure the lower half of an elliptical spring to the axle, where such a spring is used as a side spring, but when the same is used as a front or rear spring, is secured to the axle in the usual manner.

The plate 4, when clamped upon the springs, forms a substantial brace which prevents breaking of the leaves at their centers where the bolt 3 passes through them, and its stepped ends hold the spring against endwise movement. To the ends of the supplemental spring 2, are secured depending U-shaped stirrups 10, by bolts 11, which pass through the ends of the stirrups, and through the bent end of the longest leaf of the said supplemental spring. The ends of the supplemental spring are spaced a suitable distance from the main spring, the outer portions of which pass through the said stirrups, and the stirrups extend a suitable distance below the adjacent portions of the main spring. The sides of the stirrups adjacent to their lower ends, are provided with one or more apertures 12, the opposite apertures being in line. Through one pair of the apertures, in each stirrup, is passed a bolt 13, and upon these bolts, between the sides of the stirrup, are mounted pieces of tubing 14, which fit loosely on the bolts, and act as rollers.

Figs. 1, 2, and 3, illustrate a semi-elliptical side spring, having the stirrups above described, and by referring more particularly to Fig. 2, it will be seen that the portions of the main spring which pass through the stirrups normally lie a suitable distance above the rollers 14, and consequently out of engagement with them, and on smooth roads the main springs alone support the weight of the vehicle, but when the main spring is depressed beyond its normal limit, the portions thereof lying between the sides of the stirrup engage and bear upon the rollers 14, whereby the supplemental springs are brought into coöperative action, and the shock is thus sustained by the combined tension of the main and supplemental springs.

On the rebound, the rollers engage the under side of the main spring until the supplemental spring reaches its normal plane, and the main spring then continues its upward movement until it engages the under side of the supplemental spring, which thus exerts a resilient downward pressure on the main spring which serves to gradually check its upward movement, and thus on the depression and rebound the combined tension of the main and supplemental springs is utilized.

In Figs. 4 and 5, I have illustrated the spring as arranged when employed as an end spring. When thus used, the spring is reversed, and its ends are secured to the axle 15, and the central portion of the spring is secured either to the body of the vehicle, or to a seat or bracket 16, which is secured to the vehicle. The action of the spring when thus used, is the same as when used in the reverse order, the only difference being that the weight or load in the former case is exerted at the end of the main spring, while in the latter case it is exerted at the central portion of the spring. While in Fig. 4, I have illustrated the same form of stirrup shown in Figs. 1, 2, and 3, I however, preferably employ a modified form of stirrup 17, for end springs, such a modification being shown in Fig. 5. In this arrangement, the usual clips 18, which prevent separating of the leaves, are dispensed with, and the stirrups 17 are secured to the leaves in such a manner as to take the place of these clips 18. These stirrups rest upon and are riveted to one of the upper leaves adjacent to its ends, as shown, so as to be held against lateral movement, and bolts 19 are passed through the sides of the stirrup, and tightly against the under leaf, thus holding the leaves together. A bolt 20 is passed through the free ends of each stirrup, and this bolt supports a tubular roller 21. The ends of the longest leaf of the supplemental spring, pass through and beyond the stirrups, a suitable distance, and normally stand about midway between the rollers 21 and the under side of the main spring, but when the main spring is depressed far enough, the ends of the supplemental spring engage and bear upon the rollers 21, and the supplemental spring is thus brought into coöperative action with the main spring in receiving and absorbing the shock, as in the manner above described. By this arrangement, the stirrups move with the main portion of the spring, but as the central portion of the spring is depressed to a greater degree than the portions which carry the stirrups, it follows that the supplemental spring will also be carried down farther than the rollers 21, and will therefore engage the said rollers.

In Fig. 6 is shown an elliptical spring, which combines the action of both the spring shown in Fig. 1 and that shown in Fig. 4, and I have also illustrated both arrangements of the stirrup in connection therewith, the stirrup 10 being shown on the lower half of the spring and the stirrup 17 on the upper half thereof.

The spring herein described, not only affords variable tension to meet varying requirements, due to road conditions, but the arrangement of the stirrup also contributes largely in strengthening the spring to resist the side strains to which the springs are subjected. Also by the combination of a main and supplemental part in one spring, a more resilient cushioning can be secured for smooth or even roads, than could be obtained with springs of the usual construction, as only the main member of the spring supports the vehicle at such times, and this member is made up of a less number of leaves than the usual spring, and consequently is not so stiff.

Practical use has demonstrated that the spring above described not only possesses all the advantages of the common form of spring, but has in addition the variable tension feature by which the shock due to unevenness in the road is more thoroughly cushioned, thus contributing greatly to personal comfort, no less than to the prolongation of the life of the vehicle.

Having described my invention, what I claim as new and desire to secure by Letters Patent, is:

1. A leaf spring comprising a main part made up of leaves of varying lengths, and a supplemental part made up of leaves of varying lengths, said parts being placed together with the shortest leaf of the supplemental part resting on the longest leaf of the main part, clips for securing said parts together at their center portions, U-shaped stirrups depending from the ends of the supplemental part, through which the outer portions of the main part pass, said stirrups extending below the adjacent under sides of the main parts, and rollers carried by said stirrups and spaced from the under sides of the main part, and adapted to be engaged by the main part when the same is subjected to violent compression, thereby causing coöperative action of the parts, said supplemental part also acting to cushion the rebound of the main part.

2. The combination with a leaf spring comprising main and supplemental parts, of a reinforcing plate midway of the length of the supplemental part, having stepped ends, a seat on the under side of the main spring, a bolt extending through said parts, clips resting upon the stepped end of said plate and extending through said seat to clamp the parts of the spring together, and stirrups carried by the ends of the supplemental part, having rollers, the end portions of the main part passing through said stirrups, and being adapted to engage the said rollers when the said main part is subjected to violent compression, the supplemental part being adapted to cushion the rebound of the main part.

In testimony whereof I affix my signature in presence of two witnesses.

FRANK N. SPRAGUE.

Witnesses:
G. SARGENT ELLIOTT,
HERBERT L. CHASE.